(12) United States Patent
Freda et al.

(10) Patent No.: US 12,408,220 B2
(45) Date of Patent: Sep. 2, 2025

(54) METHODS AND APPARATUS FOR POWER SAVINGS ON A DORMANT SECONDARY CELL GROUP (SCG)

(71) Applicant: InterDigital Patent Holdings, Inc., Wilmington, DE (US)

(72) Inventors: Martino Freda, Laval (CA); Yugeswar Deenoo, Chalfont, PA (US); Ghyslain Pelletier, Montreal (CA); Oumer Teyeb, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 391 days.

(21) Appl. No.: 17/925,673

(22) PCT Filed: May 19, 2021

(86) PCT No.: PCT/US2021/033082
§ 371 (c)(1),
(2) Date: Nov. 16, 2022

(87) PCT Pub. No.: WO2021/236719
PCT Pub. Date: Nov. 25, 2021

(65) Prior Publication Data
US 2023/0199881 A1 Jun. 22, 2023

Related U.S. Application Data

(60) Provisional application No. 63/168,149, filed on Mar. 30, 2021, provisional application No. 63/136,470, (Continued)

(51) Int. Cl.
*H04W 76/15* (2018.01)
*H04L 5/00* (2006.01)
*H04W 76/28* (2018.01)

(52) U.S. Cl.
CPC .............. *H04W 76/15* (2018.02); *H04L 5/001* (2013.01); *H04L 5/0055* (2013.01); *H04W 76/28* (2018.02)

(58) Field of Classification Search
CPC ...... H04W 76/15; H04W 76/28; H04L 5/001; H04L 5/0055
See application file for complete search history.

(56) References Cited

U.S. PATENT DOCUMENTS

2009/0279445 A1* 11/2009 Nogami .................. H04L 5/023
455/452.2
2011/0010726 A1* 1/2011 Dayal ............... H04W 72/1215
719/318
(Continued)

FOREIGN PATENT DOCUMENTS

WO WO 2019/170209 A1 9/2019

OTHER PUBLICATIONS

3rd Generation Partnership Project (3GPP), "Discussion on fast SCell activation based on measurements prior to activation in NR", Qualcomm Incorporated, Verizon, Sprint, Charter Communication, Vodafone, R2-1908684, TSG RAN WG2 Meeting #107, Aug. 2019, 13 pages.
(Continued)

*Primary Examiner* — Fahmida S Chowdhury
(74) *Attorney, Agent, or Firm* — Flaster Greenberg, P.C.

(57) ABSTRACT

A method and device for power savings on a dormant secondary cell group are disclosed. In an approach, a wireless transmit receive unit (WTRU) may receive, from a network, a report configuration to report a channel quality indicator to a master cell group, MCG, or a secondary cell group, SCG, based on the received configuration (e.g. comprising different periodicities in order to report the CQI). In an approach, the channel quality indicator may be transmitted with a decreasing regularity. In an approach, the channel
(Continued)

quality indicator may be transmitted with a period (periodicity) that depends on a discontinuous reception status of the MCG. In an approach, the channel quality indicator may be transmitted depending on a presence of high priority data (e.g. number of DCIs received, preemption indication, LCH priority; PDCCH).

16 Claims, 9 Drawing Sheets

Related U.S. Application Data filed on Jan. 12, 2021, provisional application No. 63/091,700, filed on Oct. 14, 2020, provisional application No. 63/027,075, filed on May 19, 2020.

(56) References Cited

U.S. PATENT DOCUMENTS

| | | | |
|---|---|---|---|
| 2011/0216682 A1 | 9/2011 | Xu et al. | |
| 2017/0041059 A1* | 2/2017 | Yi | H04B 7/024 |
| 2018/0006773 A1 | 1/2018 | Kim et al. | |
| 2018/0359790 A1* | 12/2018 | Ingale | H04W 72/51 |
| 2019/0200413 A1 | 6/2019 | Hong | |
| 2019/0207737 A1* | 7/2019 | Babaei | H04L 27/2607 |
| 2019/0363843 A1* | 11/2019 | Gordaychik | H04W 72/044 |
| 2020/0119864 A1* | 4/2020 | Xu | H04L 1/1858 |
| 2022/0217756 A1* | 7/2022 | Wu | H04L 1/1861 |
| 2023/0199881 A1* | 6/2023 | Freda | H04L 5/0055 370/329 |

OTHER PUBLICATIONS

3rd Generation Partnership Project (3GPP), "NR; Physical layer procedures for control", 3GPP TS 38.213 V16.1.0, Mar. 2020, 156 pages.

3rd Generation Partnership Project (3GPP), "NR; Medium Access Control (MAC) protocol specification", 3GPP TS 38.321 V16.1.0, Jul. 2020, 151 pages.

3rd Generation Partnership Project (3GPP), "NR; Radio Resource Control (RRC) protocol specification", 3GPP TS 38.331 V16.1.0, Jul. 2020, 732 pages.

* cited by examiner

Split Bearer Transmissions
to Dormant SCG

Split Bearer Transmissions
to Active SCG

METHODS AND APPARATUS FOR POWER SAVINGS ON A DORMANT SECONDARY CELL GROUP (SCG)

CROSS REFERENCE TO RELATED APPLICATIONS

This application is the 371 National Stage of International Application No. PCT/US2021/033082, filed May 19, 2021, which claims the benefit of U.S. Provisional Application No. 63/027,075, filed May 19, 2020, U.S. Provisional Application No. 63/091,700, filed Oct. 14, 2020, U.S. Provisional Application No. 63/136,470, filed Jan. 12, 2021, and U.S. Provisional Application No. 63/168,149 filed Mar. 30, 2021, which are incorporated by reference as if fully set forth.

BACKGROUND

A wireless transmit receive unit (WTRU) may be configured to utilize resources provided by two different nodes connected via non-ideal backhaul, wherein the nodes may provide access using same or different radio access technologies (RATs). One node may act as the master node (MN) controlling the resources associated with one or more cells called a master cell group (MCG) and another node acting as secondary node (SN) controlling resources associated with one or more cells called a secondary cell group (SCG). The MN and SN are connected via a network interface and at least the MN is connected to the core network.

SUMMARY

Systems, methods, and devices for power savings on a dormant secondary cell group is disclosed. In an approach, a WTRU may receive, from a network, a configuration of split bearers and transmit a channel quality indicator to a master cell group or a secondary cell group based on the received configuration. In an approach, the channel quality indicator may be transmitted with a decreasing regularity. In an approach, the channel quality indicator may be transmitted with a period that depends on a discontinuous reception status. In an approach, the channel quality indicator may be transmitted depending on a presence of high priority data

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
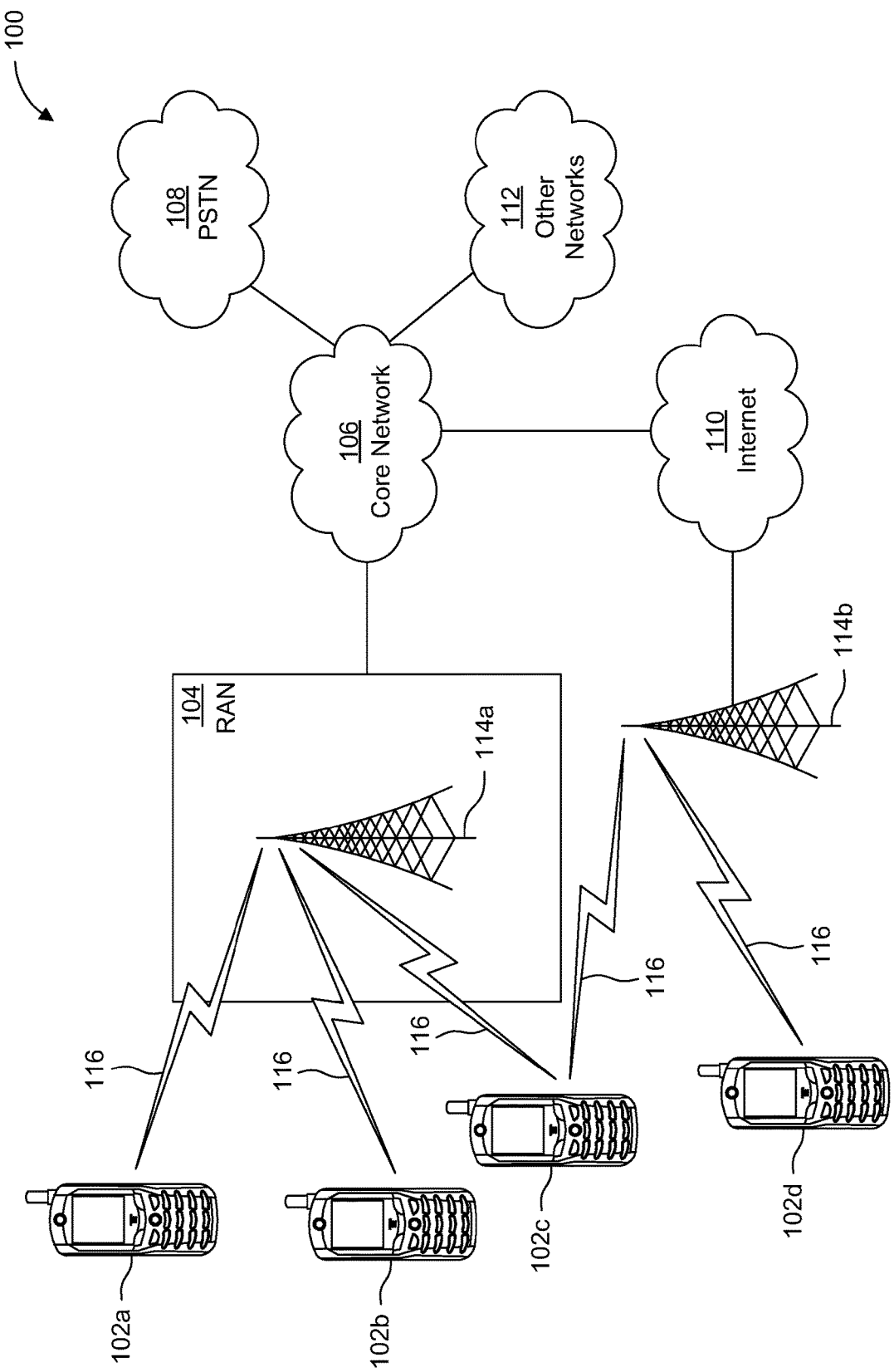
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
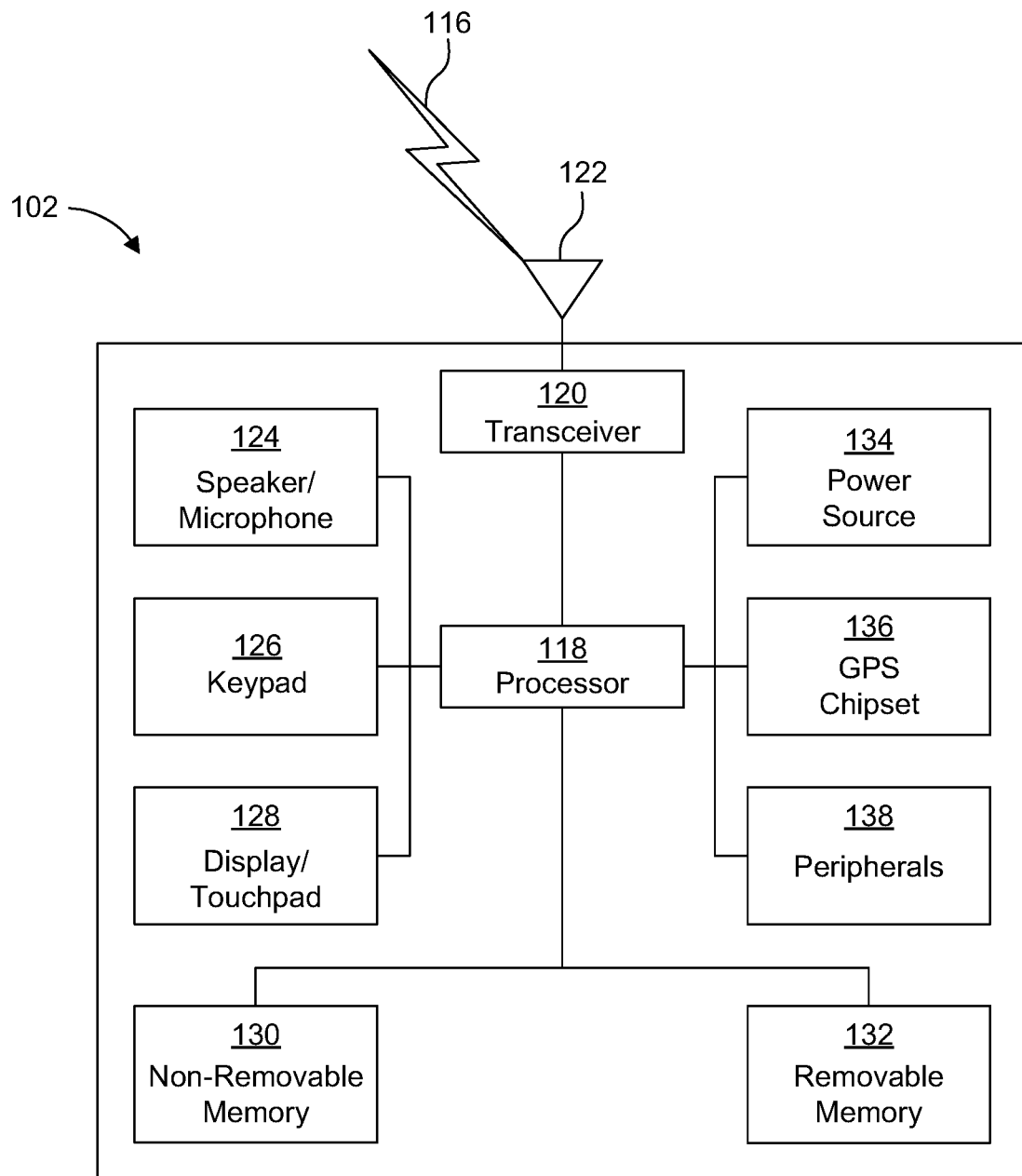
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, alight sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
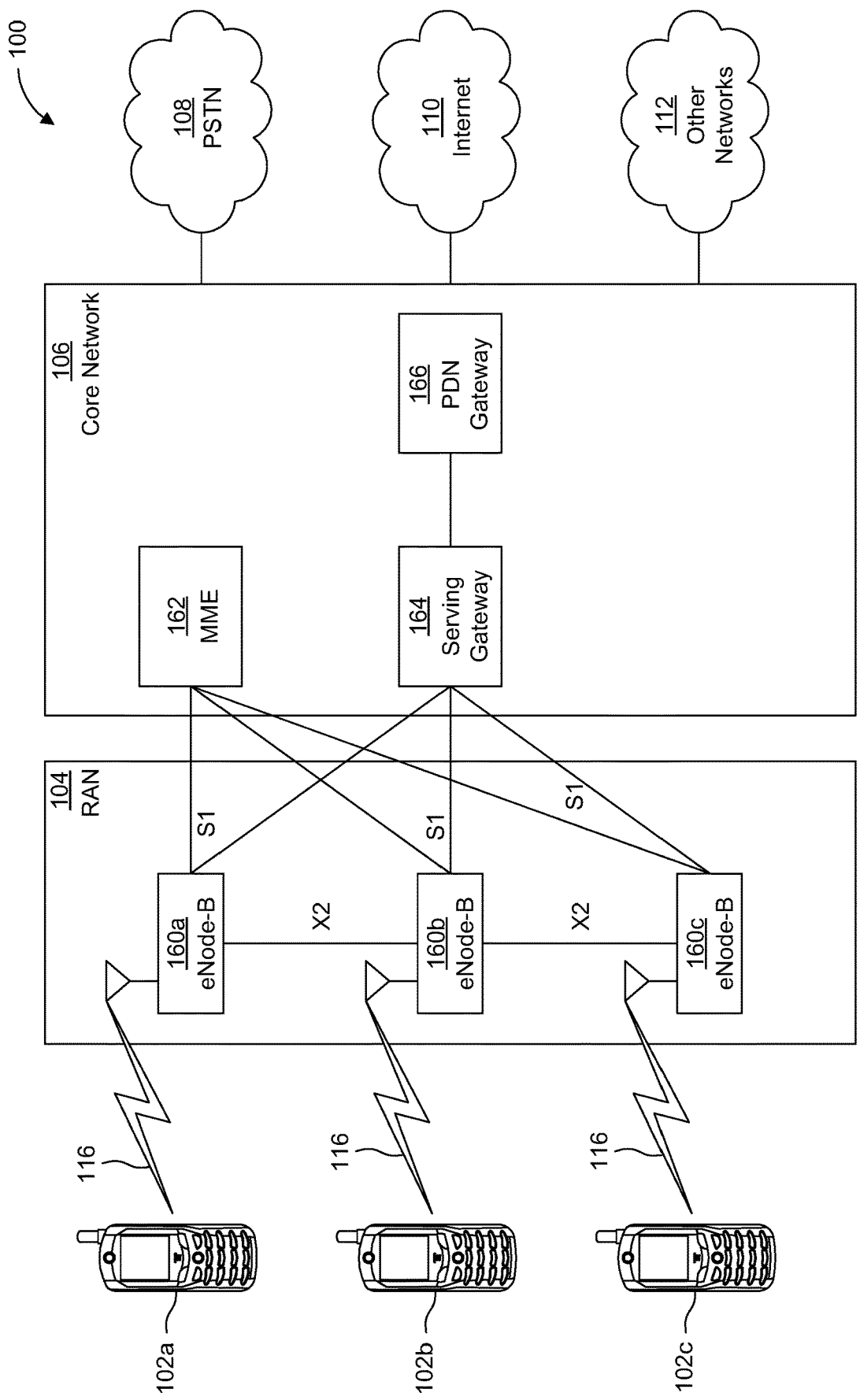
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are tom 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
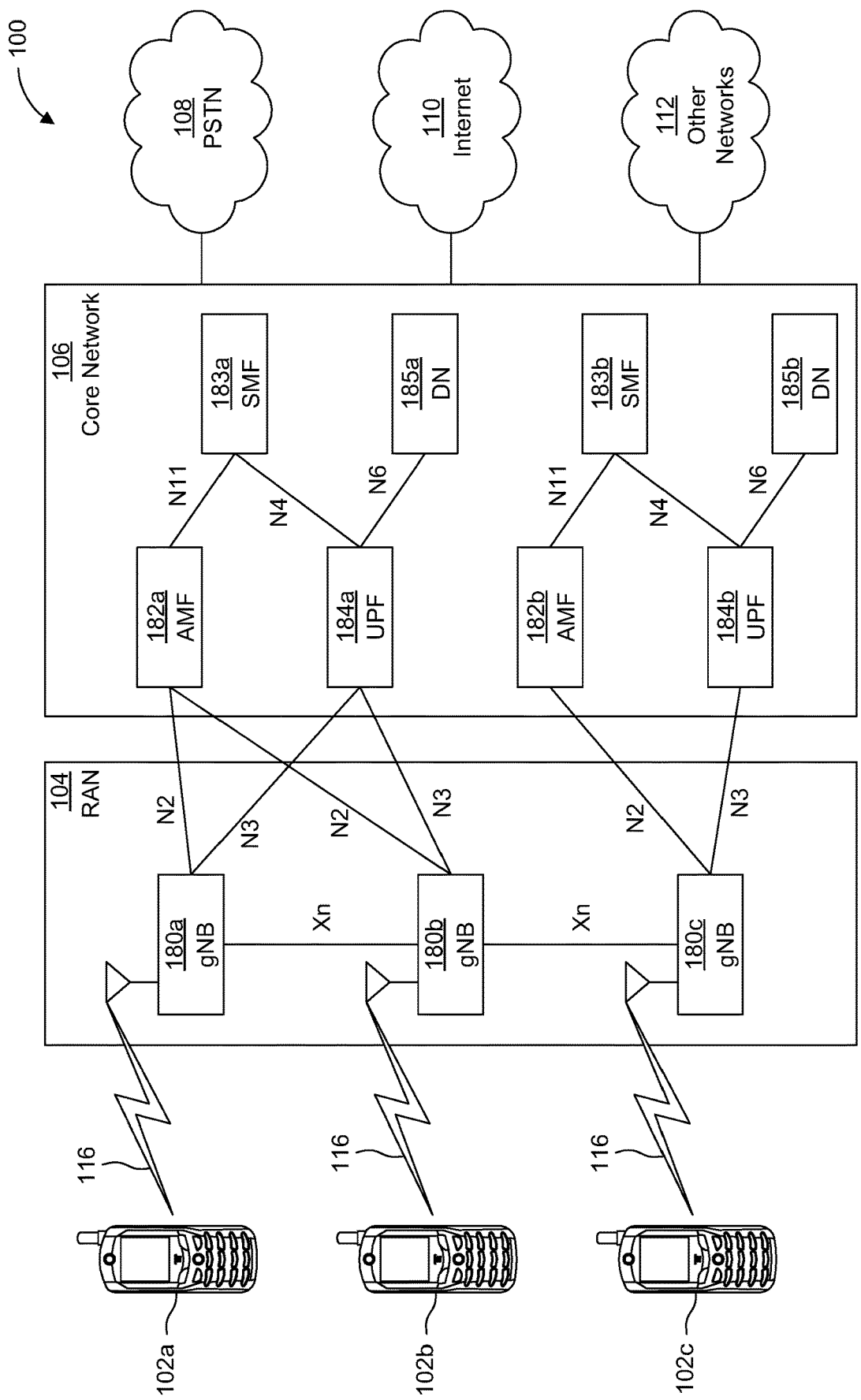
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The following description is for exemplary purposes and does not intent to limit in any way the applicability of the methods described further herein to other wireless technologies and/or to wireless technology using different principles, when applicable. The term network in this disclosure may refer to one or more gNBs which in turn may be associated with one or more Transmission/Reception Points (TRPs) or any other node in the radio access network. The term MR-DC (Multi-Radio Dual Connectivity) indicates a Dual Connectivity between E-UTRA and NR nodes, or between two NR nodes. Throughout this application, unless otherwise indicated, the terms US and WTRU may be used interchangeably.

A WTRU may be configured to utilize resources provided by two different nodes connected via non-ideal backhaul, wherein the nodes may provide access using same or different RATs. One node may act as a master node (MN) controlling the resources associated with one or more cells called master cell group (MCG) and another node acting as a secondary node (SN) controlling resources associated with one or more cells called secondary cell group (SCG). The MN and SN are connected via a network interface and at least the MN is connected to the core network.

In case of dual connectivity, the WTRU may be configured with two MAC entities-one MAC entity for the MCG and one MAC entity for SCG.

The WTRU may be configured to receive and process RRC reconfiguration messages via the MCG, wherein the reconfiguration may result in SCG addition, change/modification, or release.

The WTRU may be configured to receive and process RRC reconfiguration messages via the SCG, wherein the reconfiguration may not require coordination with MN.

Activation/deactivation of SCells in NR are discussed below. NR supports activation/deactivation of SCells via MAC control element (CE). If a SCell is deactivated, the WTRU may not perform any one of the following processes: (1) transmission of SRS on the SCell; (2) reporting of CSI for the SCell; (3) transmission on Uplink Shared Channel (UL-SCH); (4) transmission of random-access channel (RACH); (4) monitoring on physical downlink control channel (PDCCH) on the SCell or for the SCell (via another activated SCell); and (5) transmission of physical uplink control channel (PUCCH).

A WTRU may be activated/deactivated via a MAC CE activation/deactivation command. A WTRU may also move from activated to deactivated following expiry of a SCell deactivation timer.

To have a more dynamic mechanism for supporting power savings on SCells, NW may also support the concept of dormancy. For dormancy, the WTRU may maintain some of the functionality of an activated SCell, while saving power by not performing PDCCH monitoring. Furthermore, dormancy may be achieved by switching (via L1 signaling using downlink control information (DCI)) a WTRU to a dormant bandwidth part (BWP). When on the dormant BWP, the WTRU may perform one or more of the following processes: (1) not transmitting SRS; (2) reporting CSI (only periodic and semi-static); (3) not monitoring PDCCH on the SCell or for the SCell; (4) performing beam management and beam failure recovery procedure; not transmitting on PUCCH; and (5) not transmitting RACH.

Dormancy may be associated with an activated SCell state. A WTRU may be changed to a dormant BWP when it is in SCell active state. However, a WTRU may not be changed to/from a dormant BWP while in SCell deactivated state. DCI on another SCell may move a SCell from the dormant BWP to a non-dormant BWP.

Dormancy behavior on a SCell may allow achieving a tradeoff between power savings and low latency activation by reporting CSI measurements to the network while in dormancy. In this way, the network is able to quickly schedule the WTRU after it transitions out of dormancy. The WTRU may still benefit from some power savings gain as it may not monitor PDCCH while on the dormant BWP.

Similar power savings advantages may also be beneficial for a WTRU configured in MR-DC. Specifically, a WTRU may benefit from a mechanism where a SCG may be quickly activated and the WTRU may be scheduled on the SCG without prolonged delay for activation. SCell dormancy may be achieved by relying on the primary secondary cell (PSCell) (which is assumed activated) to perform signaling. However, using the dormancy concept on the SCG by considering methods to reduce power consumption at the PSCell (e.g., by introducing a dormant PSCell) poses the following issues as to how to perform this signaling.

First, sending CSI reports (to enable fast activation) on the MCG would result in latency (associated with MN-SN signaling) which may make such reports out-dated when received at the scheduler on the SN. On the other hand, sending these reports directly to the SN would require UL transmissions from the PSCell, and this may reduce the benefits of the power savings. An efficient mechanism for sending CSI reports of the PSCell to the network would be required to support power savings on the SCG.

Second, a WTRU may achieve UL timing alignment for a SCell (e.g., for transmission of SR, CSI, etc.) if that SCell is configured in the same TAG as the PCell/PSCell. In the case of SCG, maintenance of TA for the PSCell may consume power and may be unwanted. However, if the WTRU does not perform TA, it may no longer send CSI directly to the SCG. How to handle loss of uplink timing to the SCG needs to be considered when sending CSI to the network for fast activation of the SCG.

Third, dormant SCell may be activated via PCell/PSCell. When similar dormancy needs to be extended to PSCell, a mechanism may be needed for the network to activate the PSCell. PDCCH monitoring at the PSCell for such activation will consume power. On the other hand, if the activation is sent by the MN, the activation may be delayed significantly due to latency from MN-SN signaling. A method may be needed for the PSCell/SCG in order to reduce latency of activation signaling while still achieving power savings for the SCG.

The following description will describe methods for efficient CQI reporting on SCG. It should be noted that in the following methods, embodiments are described for the reporting of CQI by the WTRU. However, such solutions may also apply, without loss of generality, for any WTRU measurements reported to the network such as RRM measurements, congestion measurements (CBR), sidelink traffic information (e.g., UEAssistanceInformation), and/or location information, etc. It should also be noted that in the following methods, actions performed to, or in relation of the "MCG" may include the PCell on the MCG and/or any combination of any number of SCells on the MCG. Actions performed to, or in relation of the "SCG" may include the PSCell on the SCG, and/or any combination of any number of SCells on the SCG.

Activity behavior may be any aspect of the WTRU associated with PDCCH monitoring, dormancy behavior, arrival of data at the WTRU, transmission of data to the WTRU, transition between dormancy and non-dormancy (or vice versa), DRX state, and/or reception of a wakeup signal as well as any parameter derived from the occurrence of events. The parameter may be, for example, a number of such events, a time period between such events, a rate of occurrence of such events, a number of occurrences of such event in a period of time, and/or the state of a DRX timer, etc.

A WTRU may adapt CQI reporting on a cell (e.g., PSCell) based on activity behavior of another cell/cell group. In one embodiment, a WTRU may adapt CQI reporting behavior on one cell based on activity behavior associated with another cell or cell group. Specifically, a WTRU may be configured with a rule to adapt CQI reporting behavior on SCG based on any factor of activity behavior on MCG and/or SCG. Such rule may be configured by the network. Specifically, a WTRU may be configured by the network to determine/change any of the following properties of CQI reporting on SCG based on activity behavior (as defined above) on MCG and/or SCG.

A WTRU may be configured to determine/change whether or not CQI reporting is performed. For example, CQI reports may be transmitted under a first condition, and may not be transmitted under a second condition.

A WTRU may also be configured to determine/change the periodicity of the CQI reporting. For example, CQI reporting may be transmitted with a first periodicity under a first condition and a second periodicity under a second condition. The WTRU may be configured with two or more periodicities, and may determine the configured periodicity based on a rule.

A WTRU may also be configured to determine/change the granularity of CQI reports. For example, CQI reports may contain a number of bits, or indicate a specific granularity for the report under a first condition, and have a different number of bits/granularity under a second condition. The WTRU may be configured with two or more granularities to use, and may determine which of the configured granularity based on a rule.

A WTRU may also be configured to determine/change the location/density/configuration of CSI-RS resources measured by the WTRU. For example, the WTRU may be configured with a first density of CSI-RS resources to be measured under a first condition, and assume a second density of CSI-RS resources to be measured under a second condition.

A WTRU may also be configured to determine/change the type of CQI reporting (e.g., periodic, semi-static, dynamic) to be performed. For example, a WTRU may assume one type of CQI reporting (e.g., periodic only) under a first condition, and assume a different type of CQI reporting (e.g., all types) under a second condition.

A WTRU may also be configured to determine/change the information or measurement to be reported in the CQI reports (CQI, RI, RSRP, etc.) For example, a WTRU may report a first quantity or set of quantity in CQI reports under a first condition and report a second quantity or set of quantiles under a second condition. The first set of quantities and second set of quantities may be overlapping.

A WTRU may also be configured to determine/change the cell (PSCell or SCell) or cell group (MCG or SCG) in which CQI is reported. For example, a WTRU may report SCG CQI to the MCG under a first condition, and may report SCG CQI to the SCG under a second condition.

A WTRU may derive the conditions for adapting CQI reporting behavior on the SCG based on any aspect of the WTRU's activity behavior on either or both of the MCG/SCG, such as (but not limited to) any or a combination of the following: (1) the time elapsed since the last reception of an activation/deactivation, a BWP switching, and/or a transition from dormancy to non-dormancy, or vice versa on the PSCell or MCG or SCG, or on any SCell(s) of the MCG or SCG; (2) the DRX status associated with MCG or SCG, such as: whether DRX is configured or not, whether the WTRU is active or not with respect to DRX, and/or whether a specific DRX timer is currently running or not; (3) the time elapsed since the last reception of data scheduling on MCG or SCG, possibly while configured with DRX on that CG; (4) the configuration of dedicated radio bearers (DRBs) at the WTRU and/or presence and/or amount of data (possibly expected) at each of these DRBs (i.e. presence of a MCG bearer, SCG bearer, split bearer, configured UL split threshold, etc.); (5) the presence and/or the amount of transmissions received on another cell group, which may be possibly associated to a high priority transmission or possibly associated to a transmission on a split bearer; (6) reception, from the network, of an activation/deactivation command or similar, where such command may imply at least changing the monitoring of PDCCH; (7) reception or absence of a WUS (wake up signal) on MCG or SCG; (8) the arrival of data at a WTRU buffer, possibly associated with a specific bearer or bearer type (as defined herein); and/or (9) the amount of data in the WTRU buffers, possibly associated with a bearer or bearer type (e.g., amount of data above a threshold).

Exemplary embodiments of the above methods are presented herein. Without loss of generality, combinations of the example embodiments are also possible.

In one scenario, a WTRU may report CQI with decreasing regularity as the time within dormancy increases. In one embodiment, the WTRU may adapt its SCG CQI reporting behavior based on the time elapsed since the start of dormancy on SCG. For example, a WTRU in dormancy on SCG may be configured to report CQI on the PSCell of the SCG, with a different periodicity depending on the time elapsed since the WTRU was transitioned to dormancy on the SCG.

For example, a WTRU may be configured with a first periodicity of CQI reporting to be used during a first time period starting when the WTRU may be transitioned to dormancy on the SCG to a first time instant (T1) including some elapsed time from the time in which the WTRU may be transitioned to dormancy on the SCG. The WTRU may report CQI according to the first configured periodicity during this first time period. The WTRU may be configured with a second periodicity of CQI reporting to be used during a second time period which starts at T1 and ends at some second configured time instant (T2) including some elapsed time from the time in which the WTRU may be transitioned to dormancy on the SCG. The WTRU may report CQI according to the second configured periodicity during this second time period. Further time periods and CQI reporting periodicities may be configured as above. A time period may also include a starting time instant without any ending time instant, in which case the WTRU may continue reporting at the configured periodicity until the WTRU is transitioned out of dormancy.

In the above embodiment, the time periods may include a configured number of reports. For example, the WTRU may report CQI with a first periodicity until a configured number (N) CQI reports are sent, and then start reporting with a second periodicity, and so on.

In the above embodiment, the periodicity may further depend on, or be determined by the WTRU based on other factors mentioned herein, such as: (1) the value of the CQI report itself, possibly in comparison with a CQI report/measurement on a different cell; (2) the DRX-related activity behavior on the MCG; (3) the number bearers and/or the rate of transmission (e.g., MDBV) configured at the WTRU; and/or (4) buffer status at the WTRU, for any or a subset of logical channels.

In one exemplary embodiment, a WTRU may report SCG CQI with a period that depends on the DRX status on the MCG. The WTRU may be configured with a period for CQI reporting on MCG which may depend on the activity status of the WTRU on the MCG. For example, the WTRU may be configured with a first CQI reporting periodicity when the MCG is configured with DRX, and a second CQI reporting periodicity when the MCG is not configured with DRX. For example, the WTRU may be configured with a first CQI reporting periodicity when the WTRU is in DRX active state (i.e., PDCCH is being monitored) on the MCG, and a second reporting periodicity when the WTRU is in DRX inactive state (i.e., PDCCH is not being monitored). A WTRU may be configured to report SCG CQI only when the WTRU is in DRX active time on MCG. A WTRU may also be configured to report SCG CQI only when the WTRU is configured in DRX inactive on MCG. A WTRU may also be configured to report SCG CQI only when the WTRU is not configured with DRX on MCG.

A WTRU may report CQI depending on the presence of high priority data received on the MCG. In one embodiment, the WTRU may initiate transmission of CQI to SCG, or transmit CQI to SCG with a certain periodicity based on reception of high priority data received on MCG. Such high priority data reception on MCG may be determined by any of the following receptions: (1) reception of a data from a bearer or logical channel tagged as URLLC based on some configuration element in the bearer/logical channel; (2) reception of a high priority DCI, namely a DCI containing a high priority indication; (3) reception of data from a logical channel with LCH priority above a threshold; (4) reception of a DCI with a preemption indication on MCG.

A WTRU may report CQI depending on the presence/amount of data received on the MCG, possibly associated with a specific bearer/bearer type. In one embodiment, the WTRU may determine whether to transmit CQI to SCG, or determine the periodicity of CQI reporting, and/or the type of CQI reporting based on the reception of or amount of data received from the MCG. For example, a WTRU may start reporting CQI on SCG upon reception of data on MCG. In another example, a WTRU may start reporting CQI, or increase the periodicity of CQI reports when the number of scheduling events (i.e. PDCCH) on MCG in a configured time period exceeds a threshold. In another example, a WTRU may start reporting CQI, or increase the periodicity of CQI reports when the received data rate on MCG exceeds a threshold. The above examples may further be applicable to one or a subset of bearers or bearer types configured at the WTRU.

In another example, a WTRU may perform the actions in the above examples only when the data received corresponds to a specific (e.g., configured) bearer. In another example, a WTRU may perform the actions in the above examples only when the data received corresponds to data from one or more specific type(s) of bearer(s), such as: a split bearer, a SCG bearer, a MCG bearer, a MCG terminated split bearer, a SCG terminated split bearer, etc.

Figure 2:
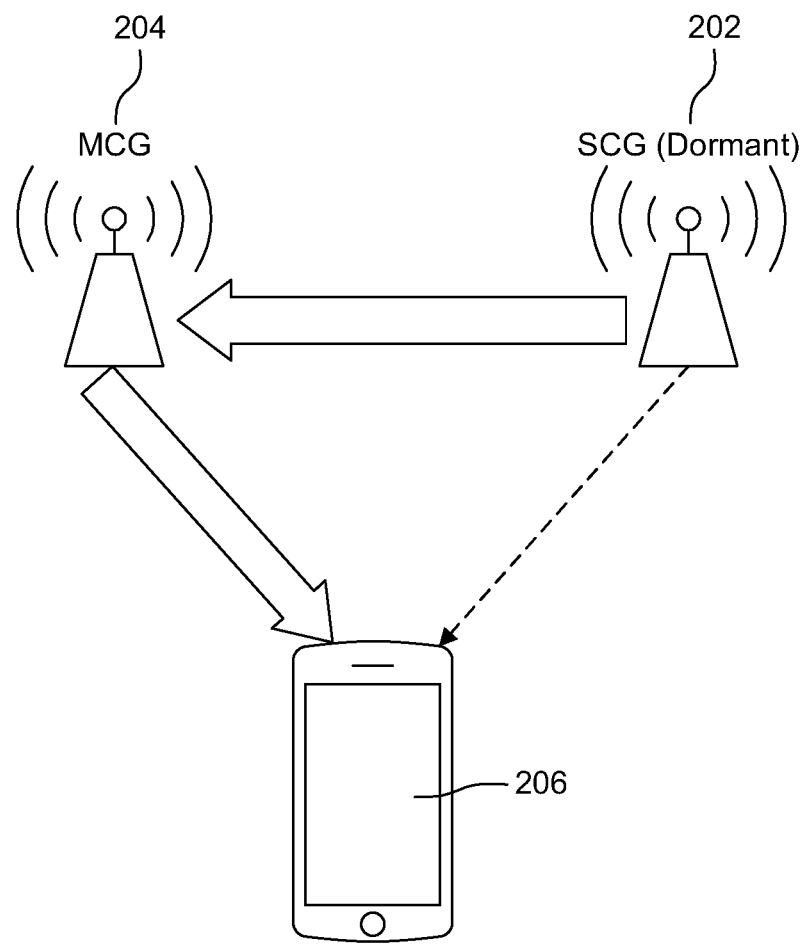
FIG. 2 is a diagram illustrating split bearer transmissions to a dormant secondary cell group (SCG)

FIG. 2 illustrates split bearer transmissions to a dormant SCG 202. As shown in FIG. 2, the WTRU 206 is configured with a split bearer terminated in the dormant SCG 202. From the perspective of the WTRU 206 (i.e., dormancy is defined from the point of view of the WTRU) when the SCG 202 is dormant, transmissions on the split bearer are made to the WTRU via the MCG 208 only. Any data which is generated at the SCG is forwarded to the MCG via Xn interface for transmission to the WTRU.

Figure 3:
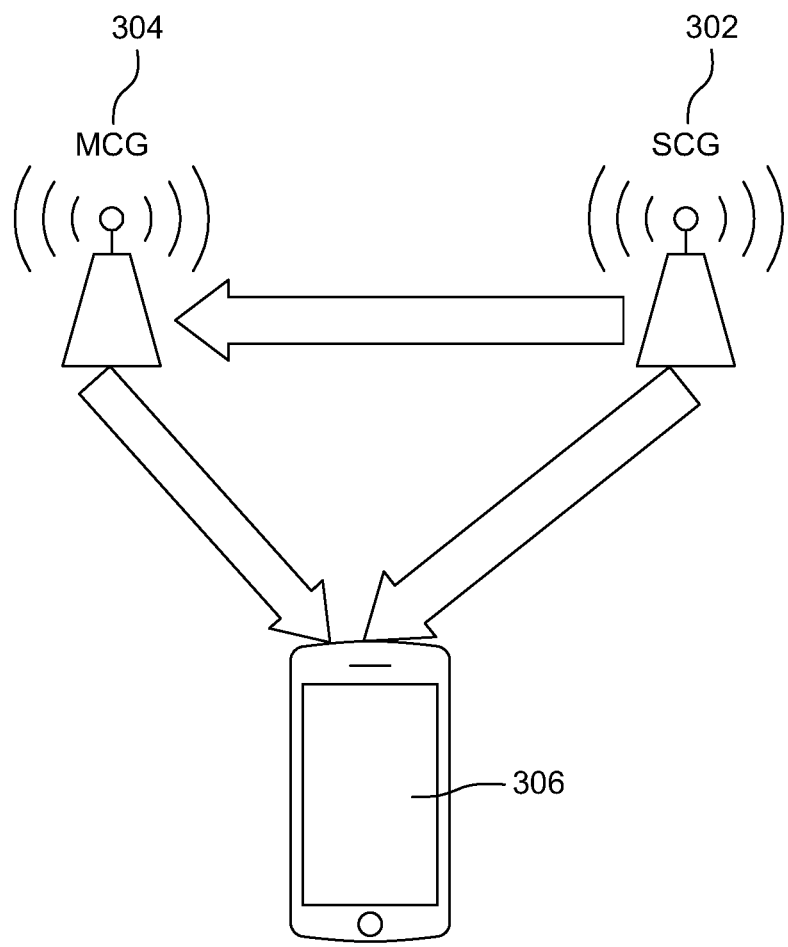
FIG. 3 is a diagram illustrating split bearer transmissions to an active SCG.

FIG. 3 illustrates split bearer transmissions to an active SCG 302. As shown in FIG. 3, the WTRU 306 is configured with a split bearer terminated in the active SCG 302. From the perspective of the WTRU 206 (i.e., dormancy is defined from the point of view of the WTRU) when the SCG 302 is active, the WTRU 306 receives DL data transmissions for the split bearer via both MCG 304 and SCG 202.

When the SCG 202 is dormant, the WTRU 206 may determine the periodicity of CQI transmissions to the SCG 202 based on the amount of high priority DCI assignments from the MCG 208. The WTRU 206 may further make such determination when the WTRU 206 is configured with at least one split bearer.

The WTRU 206 may be configured with a first periodicity/pattern of CQI reporting to SCG and a second periodicity/pattern of CQI reporting to the SCG. The periodicity/pattern may comprise of whether or not the WTRU reports CQI to the SCG.

Specifically, in the FIG. 2 the WTRU may not report CQI to the SCG while in FIG. 3, the WTRU may report CQI with a configured periodicity. The periodicity/pattern may comprise of the periodicity with which the WTRU reports CQI. For example, the WTRU may report CQI with a long period or a short period. The periodicity/pattern of CQI reporting may comprise of the type of CQI reporting (e.g., narrowband vs wideband). The WTRU may report CQI with wide band, or narrow band. The periodicity/pattern may further be a combination of whether or not the WTRU reports CQI and/or the period of CQI reporting and/or the type of CQI reporting.

The WTRU may determine the pattern/periodicity of CQI reports to the SCG based on the pattern/frequency of high priority DCI assignments on the MCG. The pattern/frequency of high priority DCI assignments on the MCG may be determined by the number of DCI assignments in a configured window. For example, the WTRU may be configured with a measurement window (N number of slots) and a threshold number of high priority DCI assignments.

Figure 4:
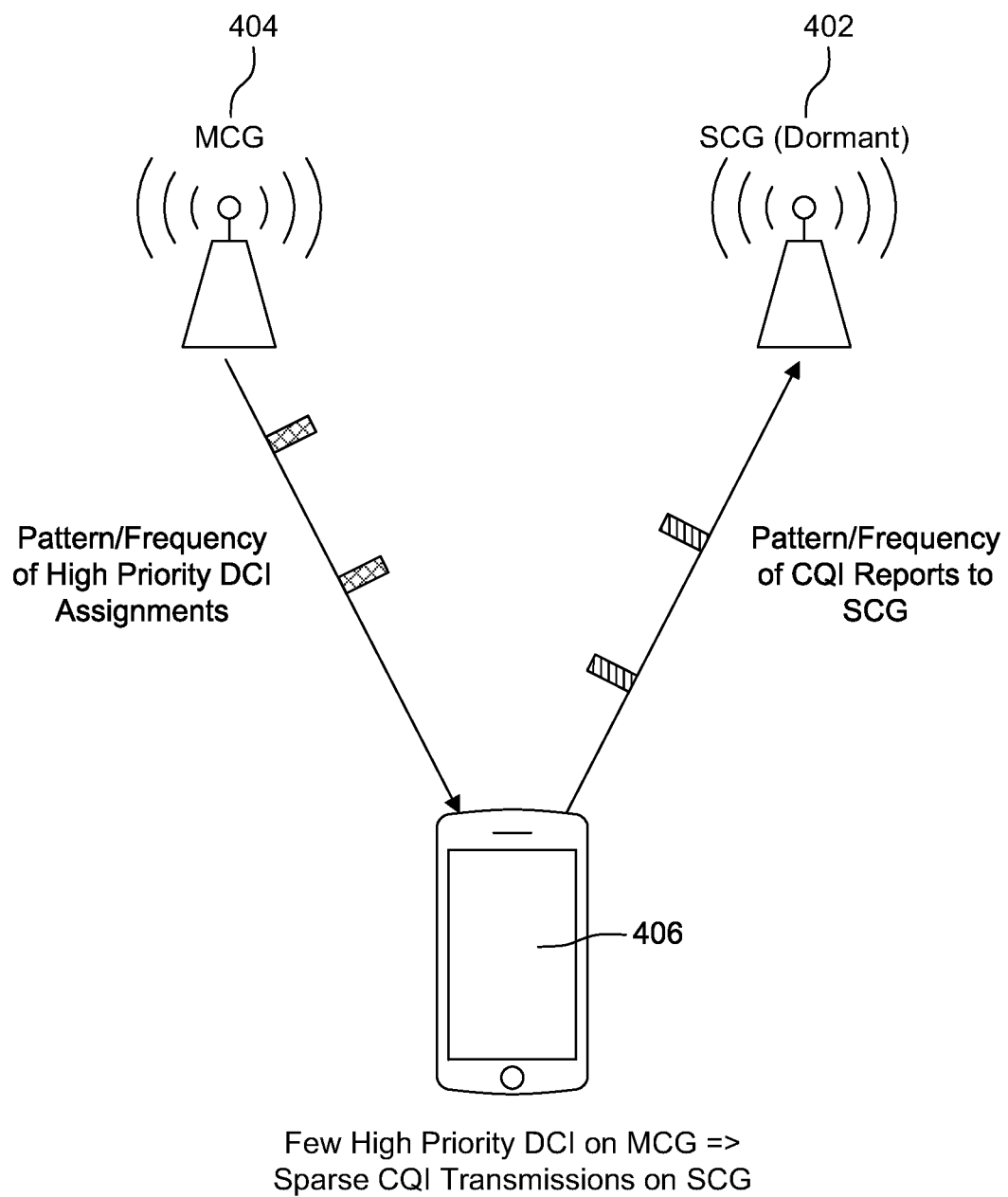
FIG. 4 is a diagram illustrating sparse channel quality indicator (CQI) transmissions on a SCG.

FIG. 4 demonstrates sparse CQI transmissions on a SCG 402. As shown in FIG. 4, if the number of high priority DCI assignments received in the last N slots is below a certain threshold, the WTRU 406 performs sparse CQI transmissions to the SCG.

Figure 5:
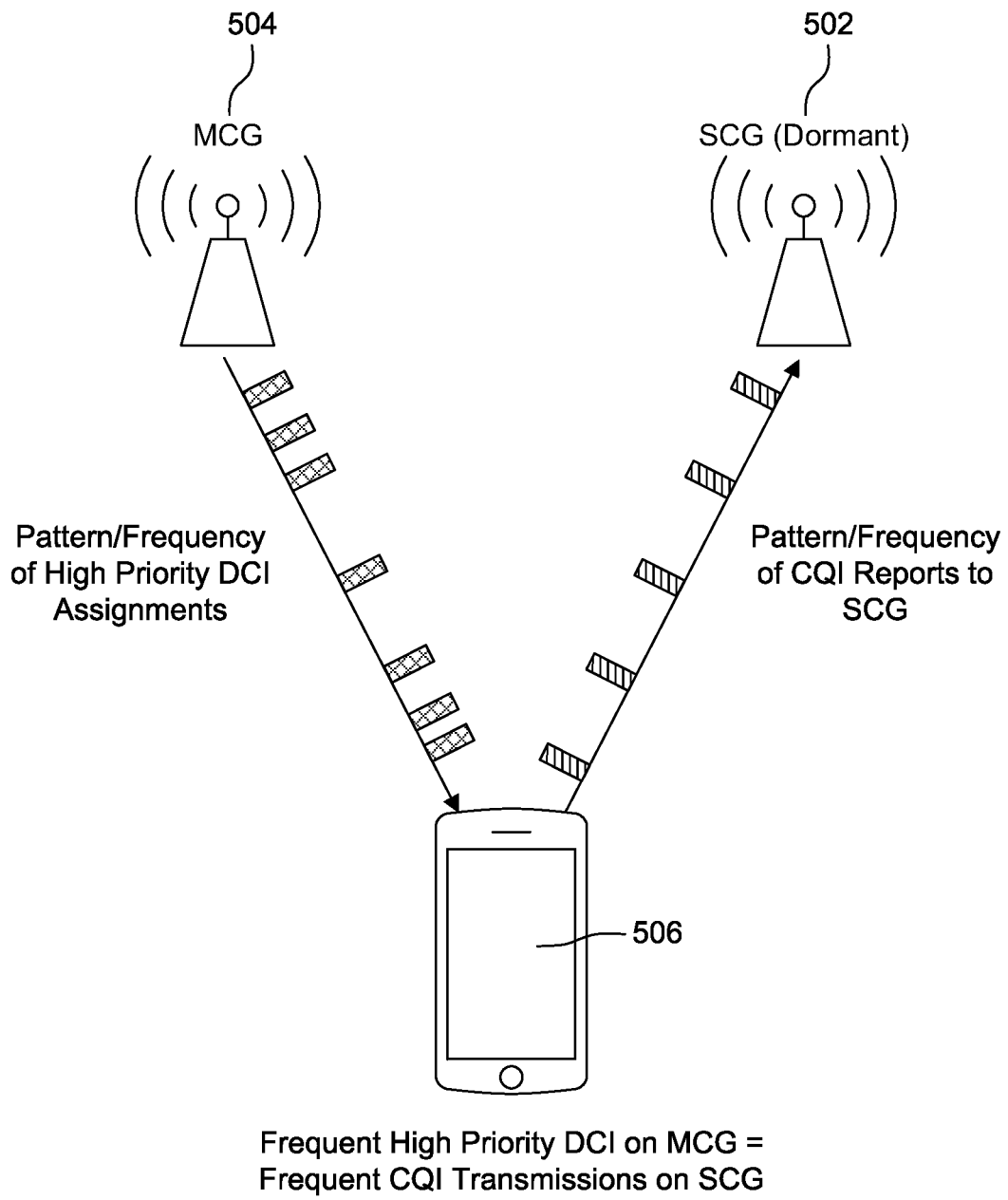
FIG. 5 is a diagram illustrating frequent CQI transmissions on a SCG.

FIG. 5 demonstrates frequent CQI transmissions on a SCG 502. As shown in FIG. 5, if the number of high priority SCG DCI assignments received in the last N slots is above a threshold, the WTRU 506 performs frequent CQI transmissions to the SCG.

The pattern/frequency of high priority DCI assignments on s MCG may be determined by the presence of at least one high priority DCI assignment on the MCG in a configured time. For example, a WTRU may set/reset a timer when it receives a high priority DCI assignment on the MCG. If the timer is running (as shown in FIG. 5), the WTRU may perform frequent CQI transmissions to the SCG. If the timer is not running/has expired (as shown in FIG. 3), the WTRU may perform sparse CQI transmissions to the SCG. Other definitions of pattern/frequency of high priority DCI assignments on the MCG are not precluded (e.g., time difference between the assignments, amount resources granted by the high priority assignments, etc.).

In one exemplary embodiment, a WTRU may adapt CQI Reporting on a cell (e.g., PSCell) based on the change of the CQI measured. In one embodiment, a WTRU may be configured to adapt CQI reporting behavior on one cell based on the change in the measured CQI to be reported. Specifically, a WTRU may change the CQI reporting behavior on a cell based on detection of a change of CQI measured. For example, a WTRU may use a first CQI reporting behavior when the change between two successive CQI measurements taken by the WTRU, possibly spaced by a period configured by the network, is below a threshold, and a second CQI reporting behavior otherwise. In another example, a WTRU may use a first CQI reporting behavior when the change between a measured CQI and the last reported CQI is larger than a threshold, and use a second CQI reporting behavior otherwise.

In another exemplary embodiment, a WTRU may determine whether to report SCG CQI to the SCG or the MCG. In one example, a WTRU may determine whether to report CQI reports relative to channel state information (CSI) measurements on the SCG (e.g., the PSCell of the SCG) to the MCG or the SCG. The WTRU may make such determination based on factors described herein for determining/adapting the CQI behavior.

In another exemplary embodiment, a WTRU may decide to report CQI to MCG or SCG based on Activity Status and/or DRB Configuration. CQI reports to the SCG may result in additional power consumption at the WTRU but may have the benefit of enabling faster transition to active scheduling when data arrives at the SCG. CQI reports of the SCG sent to the MCG may not be beneficial for SCG scheduling due to the latency associated with transferring such reports from the MN to the SN. However, such reports may still be useful for the MN to determine whether to schedule data over the SN for the WTRU (i.e., whether to activate the SN).

In another example embodiment, the WTRU may decide whether to report SCG CQI to the MCG or SCG based on network configuration/indication. For example, the WTRU may receive a RRC configuration indicating whether SCG CQI is reported to MCG or SCG. In another example, WTRU may receive PHY layer signaling (e.g., in DCI—possibly within the dormancy signaling) indicating whether to report CQI to MCG or SCG while in dormancy.

In another exemplary embodiment, the WTRU may decide whether (or when) to report SCG CQI to the MCG or the SCG based on the activity status of the WTRU on the MCG. Specifically, the WTRU may be configured with a condition for reporting the SCG CQI to the MCG and/or the SCG based on scheduling behavior, active monitoring behavior on MCG PDCCH, or any factors related to activity behavior and/or DBR configuration as defined herein.

The WTRU decision may be dependent on the DRB configuration. For example, a WTRU may report CQI to MCG when configured with a first configuration of DRBs and may report CQI to SCG when configured with a second configuration of DRBs. For example, the configuration of DRBs may include whether the WTRU is configured with a split DRB, SCG DRB, MCG terminated split DRB, and/or SCG terminated split DRB. For example, a WTRU may report CQI to the MCG only when configured with MCG DRBs or split DRBs only (i.e. no SCG DRB) and may report CQI to the SCG when configured with at least one SCG DRB. Such condition may further depend on the configuration of the SCG DRB (e.g., whether such SCG DRB is configured for URLLC). For example, the WTRU may report CQI to the SCG if configured with at least one SCG DRB or SCG split DRB having a high priority (e.g., based on LCH priority) or indicated as such (e.g., priority of the DRB is above a threshold).

The WTRU decision may be dependent on the MCG activity behavior. For example, the WTRU may report CQI to the MCG when configured with DRX on MCG and the WTRU is active (i.e., the WTRU performs PDCCH monitoring on the MCG), otherwise, it may report CQI to the SCG.

The WTRU decision may be dependent on the combination of DRB configuration and MCG activity behavior. For example, the WTRU may report CQI to the SCG when configured with at least one high priority split bearer and when DRX inactive on MCG, otherwise, the WTRU may report CQI to the SCG.

In another exemplary embodiment, a WTRU may decide whether to report CQI to MCG or SCG based on the value of the CQI. The WTRU may report CQI to MCG or SCG based on the value of the SCG CQI and/or value of the SCG CQI compared to the MCG CQI. For example, the WTRU may report CQI to the MCG only as long as the CQI is below a threshold. If the reported CQI is above a threshold, a WTRU may report CQI to SCG (possibly in addition to the MCG). In another example, the WTRU may perform (possibly a single) CQI transmission to the MCG, and following this, may report CQI periodically to the SCG. In another example, the WTRU may perform CQI transmission to the SCG if the SCG CQI is some amount larger than the CQI on the MCG. In another example, the WTRU may perform CQI to the SCG if the change (delta) of CQI measured, possibly between two instances in time, exceeds a threshold, otherwise, the WTRU may report the SCG CQI to the MCG.

In another exemplary embodiment, a WTRU may determine to report SCG CQI to the SCG or the MCG based on change of measured CQI. In one example, the WTRU may report CQI to MCG or SCG based on the change in the CQI value. For example, the WTRU may report SCG CQI to the SCG if the change in CQI (from the last value reported to the SCG and/or MCG) is larger than a threshold, otherwise, it may report CQI to the MCG.

In another exemplary embodiment, a WTRU reporting of CQI may depend on the value of CQI report on SCG compared with MCG. In one example, which may be used in combination with any previously discussed embodiments, a WTRU may determine whether and/or how to report SCG CQI based on the value of the CQI to be reported. The condition on the value of the SCG CQI may further be in combination with the CQI measured on the MCG. For example, the WTRU may perform a single measurement of CQI for each of MCG/SCG and determine the whether/how to report SCG CQI to MCG or SCG based on such measurement. Alternatively, a WTRU may perform an averaged CQI measurement (over a number of measurements or a configured time) and make such determination based on the computed average.

In another exemplary embodiment, the WTRU may report CQI to the SCG only when the measured SCG CQI is above a threshold and/or the SCG CQI is some amount (e.g., configured delta) above the measured MCG CQI. The WTRU may start periodic reporting of CQI when such condition is met. The WTRU may also stop such periodic reporting of CQI to the SCG following a similar condition (e.g., SCG CQI falls below a second threshold and/or SCG CQI is some second amount below the measured MCG CQI).

In another exemplary embodiment, the WTRU may report CQI to the SCG only when the measured SCG CQI changes by some amount (e.g., configured delta) with respect to the last reported SCG and/or MCG CQI reported.

In another exemplary embodiment, a WTRU may transmit SCG CQI to the MCG. In one example, applicable to the case where the WTRU may report SCG CQI to the MCG, a WTRU may include SCG CQI reports on a MCG control and/or data transmission. In one example, a WTRU may be configured to include a SCG CQI report in a MAC CE transmitted in a UL resource, where the decision of whether to transmit the MAC CE may further depend on factors described herein. In another example, a WTRU may transmit the CQI report to the MCG provided the reported CQI is larger than a threshold, otherwise, it may not report the CQI. In another example, a WTRU may transmit the CQI report to the MCG provided the different compared to the last CQI reported (to either MCG or SCG) is larger than a configured threshold.

A WTRU may also be configured to include a SCG CQI report in a RRC message. In this case, the factors affecting the transmission of the RRC message may be similar to those discussed for transmission of the RRC message.

A WTRU may also be configured to include a SCG CQI report with any or certain configured RRC measurement reports to MCG. In one example, a WTRU may include a SCG CQI report with a measurement report to the MCG if the reporting configuration explicitly indicates to include SCG CQI reports. In another example, a WTRU may include a SCG CQI report with a measurement report when one or more of the cells which triggered the measurement report are cells which are part of the dormant SCG configuration A WTRU may also be configured to include a SCG CQI report on MCG PUCCH. In one example, a WTRU may be configured with PUCCH resources on MCG for transmission of SCG CQI. Such resources may be separately configured from the resources configured for reporting of SCG CQI. For example, a WTRU may be configured to utilize a certain number/pattern of PUCCH resources (e.g., a specific slot number of PUCCH resources) intended for reporting SCG CQI. The WTRU may receive the expected pattern of resources from NW configuration. The WTRU may use the MCG CQI PUCCH resources for SCG CQI reporting based on specific conditions related to being configured to report SCG CQI to MCG configured by the network (including any of the conditions described herein).

In another example, a WTRU may transmit SCG CQI on PUCCH resources intended for MCG CQI. The WTRU may further be configured with rules as to when to prioritize SCG CQI over MCG CQI, where such rules may be based on conditions described herein. A WTRU may further send an indication to the network (explicitly or implicitly) when it may use PUCCH resources to transmit MCG CQI. In another example, the WTRU may include an explicit indication in the CQI report, or may use one of a number of reserved CQI values to indicate that SCG CQI is being transmitted. A WTRU may use such PUCCH resources exclusively for MCG CQI when SCG CQI reporting to the MCG is not configured/determined by the WTRU.

In another exemplary embodiment, a WTRU may determine the priority of the SCG CQI MAC CE. A WTRU configured to, or which determines to, transmit SCG CQI MAC CE may further be configured with rules for determining the priority of such MAC CE to be used during LCP procedure. The WTRU may further apply such rules when the WTRU is transmitting the SCG CQI MAC CE to MCG or to SCG. The WTRU may be configured with different rules (e.g., threshold, etc.) for determining the MAC CE priority depending on whether the SCG CQI MAC CE is transmitted to the MCG or the SCG.

The WTRU may determine the priority of the SCG CQI MAC CE for logical channel prioritization (LCP) based on any of the following: (1) the bearer configuration; (2) the activity state on the MCG, as described herein; (3) the change of CQI value from the last time CQI was reported; and (4) any condition described herein. For example, the CQI report MAC CE may be configured with a first priority under a first configuration of bearers, and may be configured with a second priority under a second configuration of bearers. In one example, the CQI report MAC CE may be configured with a first priority when the time since the WTRU was placed in dormancy is below a threshold, and a second priority when the time since the WTRU was place in dormancy is above a threshold. In another example, the CQI report MAC CE may be configured with a priority which may depend on the change (delta) in CQI from the last reported CQI value. Any condition described herein for determining the CQI reporting behavior may also be used to determine the priority of the MAC CE. A WTRU may include the MAC CE into the resources associated with the UL grant using the priority determined above.

In another exemplary embodiment, a WTRU may report SCG CQI reports to the NW using a different format. In one example, where the WTRU may decide to report CQI to the MCG, the WTRU may send such reports to the MCG using a different format compared to if they would be sent to SCG. For example, the WTRU may use a different CQI mapping table and/or different granularity for reporting CQI to MCG vs SCG. The WTRU may also use a different number of bits to report CQI to MCG versus SCG. Such may be beneficial to limit the amount of signaling associated with CQI reporting on MCG, given that such reporting to MCG is beneficial for SCG activation rather than actual scheduling decisions.

In another exemplary embodiment, a WTRU may report CQI feedback following loss of UL sync. When SCG is dormant for extended periods of time, the WTRU may lose UL synchronization. In such a case, the WTRU may be unable to report CQI to SCG until UL synchronization is re-established. In one example, a WTRU may trigger a random-access channel (RACH) procedure whenever a CQI report is scheduled at the WTRU and the WTRU has lost UL synchronization to the SCG (e.g., at the expiry of a timing alignment timer). A WTRU may further change the mechanism used to report CQI in such case. For example, the WTRU may transmit the CQI report in a MAC CE. The WTRU may report CQI after expiry of timing alignment timer by including the CQI report (e.g., as a MAC CE) in a 2-step RACH, otherwise, if timing alignment timer associated with the PSCell is still running, the WTRU may report CQI using PUCCH. The WTRU may report only a single CQI report using 2-step RACH at the expiry of such timer, and then continue to report CQI using PUCCH. The WTRU may be configured to trigger a 2-step RACH procedure when CQI report is triggered and PSCell timing alignment timer at the WTRU has expired.

Alternatively, a WTRU may decide between the use of 2-step RACH versus 4 step RACH, depending on the time elapsed since the expiry of the timing alignment timer. Specifically, a WTRU may start a new timer following expiry of the timing alignment timer. If a CQI report is triggered while the new timer is running, the WTRU may send the CQI feedback using 2-step RACH, otherwise, if the CQI is triggered after expiry of the new timer, the WTRU may send the CQI using 4-step RACH.

In another embodiment, a WTRU may trigger a RACH procedure immediately following expiry of the timing alignment timer on the SCG if it is configured to report CQI to the SCG. The WTRU may further trigger a CQI report using a MAC CE upon expiry of the timer. The WTRU may use a 2-step or 4-step RACH procedure. The WTRU may report the last value of CQI that was measured, but not reported, at the time when the timing alignment timer expires. Alternatively, a WTRU may report a previously reported value of CQI and may further indicate (e.g., in the MAC CE for the CQI) that the CQI reported corresponds to a previously reported value.

Specifically, in the case of 4-step RACH, the WTRU may trigger a RACH procedure upon expiry of the timing alignment timer. The WTRU may include, in MSG3, a MAC CE containing the latest measured CQI value. If the WTRU does not have a pending CQI to report, the WTRU may include an indication of such (e.g., in a MAC CE and/or the last reported CQI report). In the case of 4-step RACH, the WTRU may trigger a RACH procedure upon expiry of the timing alignment timer, and may include, in MSGA, either the last CQI value to be reported, and indication that there is no CQI pending to be reported, and/or a CQI that was previously reported to the network.

In another embodiment, a WTRU may trigger a CQI report using PUCCH immediately following expiry of the timing alignment timer, and then send the subsequent CQI report after that one using a RACH procedure and/or trigger RACH procedure.

In another exemplary embodiment a WTRU may determine whether to retry RACH procedure at the expiry of TAT. In one example, a WTRU may determine whether to resend/retry a RACH procedure at the expiry of the timing alignment timer depending on whether the WTRU has a CQI report to send and/or the nature of the CQI report. Specifically, a WTRU may determine, upon a failed RACH procedure while configured to send CQI to a dormant SCG, whether to retry RACH procedure based on a condition related to any of the following: (1) whether the CQI report is providing new information to the network; (2) whether the CQI report has changed, by an amount, since the last report; and (3) based on DL measurements of the PSCell.

For example, a WTRU may, upon failed RACH procedure triggered by TAT expiry while configured with CQI reporting to the SCG, retry the RACH procedure if the CQI reported is not the same as was previously reported, and not retry RACH procedure otherwise. A WTRU may be configured with a threshold change amount (which may be zero, for example). If the CQI to be reported has change by an amount that is larger than the threshold, the WTRU may retry a failed RACH procedure upon TAT while configured to report CQI to SCG. A WTRU may determine whether to retry a failed RACH procedure upon TAT while configured to report CQI to SCG if the DL RSRP is larger than a threshold, and not retry the RACH procedure otherwise.

A WTRU, upon receiving a TAC from the RACH procedure, may then report subsequent CQI using PUCCH on SCG. In one embodiment, a WTRU may report a pending CQI report (which was not reported due to RACH failure at TAT expiry) using PUCCH. A WTRU may report the pending CQI, but include an indication (e.g., using the PUCCH resource itself, reporting a special CQI value that may implicitly indicate such report is out of date, or sending another indication—e.g., SR). Alternatively, the WTRU may decide whether to report the pending CQI report or drop the pending CQI report depending on the time between the failed RACH procedure and the PUCCH resources.

In another exemplary embodiment, a WTRU is configured with a different (set of) RACH parameters for TAT expiry while the SCG is dormant. In one example, a WTRU may be configured with a different (set of) RACH parameters for TAT expiry while in SCG dormancy. This may include, but not be limited to: different set of preambles, different power ramping parameters, different RSRP threshold for deciding between 2-step and 4-step RACH, etc.

Method for power efficient change/switch of a BWP will not be discussed, including methods for changing a BWP on a cell. Such BWP change may be applied to the PSCell when operating in dormancy, as discussed in this section, in order to receive scheduling on a dormant SCG. Specifically, a WTRU operating on a dormant BWP of the PSCell may change to a non-dormant BWP based on the triggers discussed herein. Without loss of generality, the triggers below may also be applied to any cell (e.g., SCell on MCG or SCG).

Although the embodiments disclosed herein assume a change of BWP on the PSCell, the triggers may be associated with any behavior associated with a transition between dormancy/deactivated state for the SCG and non-dormancy/activated state of the SCG. Specifically, SCG dormancy may be associated with a stored but inactivated SCG configuration. Specifically, SCG dormancy may be associated with a deactivated PSCell. Given any such definition of dormancy, the embodiments herein may consist of triggers for moving a SCG from dormancy or non-dormancy, or vice versa. Specifically, 'changes BWP' as used herein may be replaced with "changes the dormancy state of the SCG—from dormant to non-dormant or vice versa".

In another exemplary embodiment, a WTRU may change BWP on the PSCell based on an event related to the MCG. In one example, a WTRU may change BWP on a cell on the SCG (e.g., PSCell) based on an event associated with the MCG. Such event may include any of the events described in the above description regarding change of CQI reporting. Specifically, a WTRU may change a BWP (e.g., from a non-dormant PSCell BWP to a dormant PSCell BWP) based on any or a combination of any of the following triggers/events: (1) the WTRU may receive an explicit activation command on the MCG (e.g., such activation command from the MCG may be an activation MAC CE or a RRC message); (2) the WTRU may receive one or more high priority transmissions on MCG (as defined herein); (3) an event associated with the measured value of CQI on MCG and/or SCG (e.g., the CQI on SCG may become better than a threshold); (4) the WTRU may receive data (scheduling activity) on one or more MCG split bearers; or (5) any other example event described in the above description regarding change of CQI reporting.

In another exemplary embodiment, a WTRU may change BWP on the PSCell based on an event related to CQI reporting. In one example, a WTRU may change a BWP for a cell on the SCG (e.g., PSCell) based on a trigger related to CQI reporting. Specifically, a WTRU may change a BWP (e.g., from a non-dormant PSCell BWP to a dormant PSCell BWP) as a result of a change in the property (as defined herein) of a CQI report. For example, a WTRU may change BWP when the WTRU starts CQI reporting (which such CQI report may be associated with the same cell or a different cell). In another example, a WTRU may change BWP when the WTRU triggers a change in the periodicity of the CQI reporting.

In another exemplary embodiment, a WTRU may change BWP on the PSCell based on Link Status of the MCG. In one example, a WTRU may change a BWP for a cell (e.g., the PSCell) based on a link status event on the MCG, such as RLF on MCG, T310 started/running on MCG, T310 reaches a certain configured value, a number of OOS received by RRC on MCG, etc.

In another embodiment, a WTRU may change a BWP on the PSCell based on activity on one or more MCG split bearers. A WTRU may change BWP on the PSCell based on reception of data on one or more MCG split bearers. In one example, a WTRU may change to the active BWP on the PSCell when it receives a data PDU associated with a MCG split bearer received from the MCG. In another example, a WTRU may change to the active BWP on the PSCell when it acknowledges a data PDU associated with a MCG split bearer received from the MCG. In another example, a WTRU may change to the active BWP when it receives a number of PDUs on a MCG split bearer received from the MCG within a specific time window.

Conditions for changing BWP from active to dormant on the PSCell, possibly following prior activation from split bearer reception, may be based on the absence of reception from the same or any split/SCG bearer. Alternatively, it may be based on the absence of reception from the SCG (regardless of the bearer). Specifically, a WTRU may move the PSCell from active to dormancy following a period of time T without reception of data on SCG or on any MCG split bearer.

In one embodiment, a WTRU may be configured with DRX-like behavior for the period of time in which it is operating on an active BWP or a dormant BWP, where the activity/inactivity triggers for the DRX-like behavior may be based on reception of data from a MCG split bearer and/or SCG bearer. Specifically, a WTRU may periodically change to the active BWP for the PSCell for a duration of time (the SCG on duration). The SCG on duration may be extended (by an inactivity timer) upon reception of data from a MCG split bearer and/or SCG bearer. At the end of the SCG on duration, or upon expiry of the inactivity timer, the WTRU may change the PSCell from active BWP to dormant BWP. When the PSCell is on the dormant BWP, reception from a MCG split bearer may not start the inactivity timer. When the PSCell is on the dormant BWP, reception from a MCG split bearer may not initiate a change in the BWP of the PSCell.

In another exemplary embodiment, a WTRU may periodically perform BWP change on the PSCell. In one example, a WTRU may be configured to perform periodic BWP change on a cell (e.g., change from the dormant BWP to an active BWP on the PSCell) periodically. The WTRU may further determine whether to perform such periodic switch of the BWP and/or the period of such BWP switch based on any (or a combination of) the following factors: (1) The activity status on the MCG; (2) The scheduling rate on the MCG; (3) link status on the MCG (e.g., T310 running); (4) the LCH priority associated with the configured bearers. For example, the WTRU may perform periodic BWP switched when configured with at least one LCH for which the LCH priority is larger than a threshold; (5) measurements of CQI, RRM, beam, etc. on MCG or SCG; and/or (6) buffer status at the WTRU.

Regarding factor 1 above, in one example, the activity status may be based on the DRX state on the MCG and/or whether the WTRU is in DRX at a given time. In another example, a WTRU may perform periodic change of the BWP only when the WTRU is in DRX active on the MCG In another exemplary embodiment, a WTRU may change BWP upon expiry of an inactivity timer which may be stopped but not reset. In one embodiment, which may be used in conjunction with any of the previous solutions, a WTRU may trigger a BWP change upon expiry of an inactivity timer, where such inactivity may be stopped but not reset when receiving data on the BWP prior to expiry of the timer. Specifically, a WTRU may be configured with an inactivity timer, and a BWP switch periodicity, both associated with dormancy on the PSCell. The WTRU may switch from the dormant BWP to the active BWP according to the BWP switch periodicity. The WTRU may start an inactivity timer when it switches to the active BWP. If the inactivity timer expires without reception of scheduling on the active BWP, the WTRU may switch back to the dormant BWP. If the WTRU receives a scheduling DCI on the active BWP (or a BWP change DCI), the WTRU may stop the inactivity timer and may not return to the dormant BWP until further indicated by the network.

The period in which the WTRU may stay on the dormant BWP and/or the inactivity timer may change with time since receiving the last DCI associated dormancy switch. In one embodiment which may be used in conjunction with the previous embodiments, the WTRU may remain on the dormant BWP for an amount of time which may change with the amount of time since the last reception of the DCI that moved the WTRU to the dormant BWP. For example, a WTRU may be configured with a first time (T1) and a second time (T2). The WTRU may switch from the dormant BWP to the active BWP following a time T1 spent on the dormant BWP, for the first x (where x may be configured by the NW) changes from the dormant BWP to the active BWP following reception of the DCI to switch to dormant BWP. Following the first x changes, the WTRU may instead switch from the dormant BWP to the active BWP following a time T2 spent on the dormant BWP. Additionally (or alternatively), the WTRU may be configured to use a first inactivity timer following the first x changes to the active BWP after reception of the BWP switch DCI, and use a second inactivity timer after that.

In other embodiments, a WTRU determines whether to resume from an INACTIVE state with active or dormant SCG. A WTRU may have been configured with an active or dormant SCG when the WTRU was sent to RRC_INACTIVE. A WTRU may further be configured with one or a number of rules to determine, at resume of a suspended RRC_CONNECTION, whether a stored SCG should be resumed as active or dormant. Such condition may be one or a combination of the following: an explicit indication by the network, based on INACTIVE state measurements, based on CQI measurements collected during resume procedure, based on the cell to which the WTRU resumes, and/or based on the bearer/LCH in which data arrival at the WTRU triggered a request for resume.

When the condition is an explicit indication by the network, for example, a WTRU may receive, possibly in the release message sending the WTRU to an inactive state, and indication of whether the WTRU should resume with an activated or dormant SCG. In another example, a WTRU may receive an explicit indication during the resume signaling (e.g., in the RRC resume message) of whether the WTRU should resume with an activated or dormant SCG. In another example, a WTRU may determine, based on an indication in the SIB of the camped cell, whether the WTRU should resume with an activated or dormant SCG. In another example, a WTRU may determine whether to resume with activated or dormant SCG based on an explicit indication received in the paging message.

When the condition is based on INACTIVE state measurements, for example, a WTRU may resume with an activated SCG if the measurements of the PSCell (e.g., RSRP) and/or SCells of the SCG while in INACTIVE and/or at the time of resume are above a threshold.

When the condition is based on CQI measurements collected during resume procedure, for example, a WTRU may perform CQI measurements during the resume procedure, as described further herein. A WTRU may resume with activated SCG if the measured CQI during the resume procedure is above a threshold. Otherwise, it may resume with dormant SCG.

When the condition is based on the cell to which the WTRU resumes, for example, a WTRU may resume with an activated SCG if it resume to the same cell as the cell from which it was suspended. In another example, a WTRU may be configured with a list of cells, or an area of cells in which resume performed to a cell within the list/area will be performed with an activated SCG, while resume performed outside of such list will be performed with a dormant SCG.

When the condition is based on the bearer/LCH in which data arrival at the WTRU triggered a request for resume, for example, a WTRU may be configured with bearer(s)/LCH(s) for which data arrival at that bearer/LCH should result in resume with an activated SCG. If resume by the WTRU is triggered by a bearer not configured as such, the WTRU may resume with a dormant SCG.

A WTRU may further indicate to the network the activation state of the SCG. For example, this may be an explicit indication during the resume procedure (in the resume request message, or resume complete message). Or, the indication may be implicitly based on the reporting of SCG CQI during the resume procedure. For example, a WTRU resuming with an active SCG may report CQI, using any of the methods described herein. A WTRU resuming with a dormant SCG may not report CQI. In another example, a WTRU may implicitly indicate the state of the SCG based on the value of the CQI reported during the resume. In another example, if the WTRU reports a CQI above a threshold, it may resume with an activated SCG, otherwise, it may resume with a dormant SCG.

In one embodiment, a WTRU performs temporary CQI measurements of SCG during a resume procedure. The WTRU may be provided a configuration for such CQI measurements (e.g., RS configuration) while in RRC connected mode, and may apply such configuration when performing CQI measurements in resume. Such configuration may be provided by dedicated signaling while in RRC connected mode. Alternatively, such configuration may be provided in the release message when the WTRU is transitioned to INACTIVE.

A WTRU may assume the RS configuration for performing CQI measurements becomes active at a specific point in time during the resume procedure. Specifically, a WTRU may initiate measurements of CQI based on the INACTIVE state CQI configuration at any of the following time instants: when the WTRU transmits the resume request message, the WTRU receives a paging message, when The WTRU receives the resume message from the network, when the WTRU completes synchronization to the SCG, at the time in which any combination of the previous events have occurred, or when a configurable number of slots following any of the previous events have occurred.

A WTRU may report the CQI according to the INACTIVE state configuration. A WTRU may continue to report such CQI according to the INACTIVE state configuration until any of the following time instances: until the WTRU receives a RRC message from the network in RRC_CONNECTED (e.g., a reconfiguration), until the WTRU transmits the RRC resume complete message, until the WTRU is scheduled on the SCG (i.e. at the reception of the first DCI from an cell on the SCG), or until the WTRU receives a new CQI reporting configuration associated with the SCG. Following such an event, the WTRU may fall back to reporting CQI based on the CQI reporting configuration associated with RRC_CONNECTED.

A WTRU may also report CQI during the transition to CONNECTED within a RRC message associated with the resume procedure (e.g., the resume complete message). Alternatively, the WTRU may report CQI using any of the methods described herein, either to the MCG or the SCG.

In other embodiments, a WTRU may be configured with limited RRM measurement/reporting configuration specific to SCG dormancy. A WTRU may switch from its normal measurement configuration to the dormancy configuration upon transition of the SCG to dormancy.

A WTRU may be configured with a set of limited actions, trigger events, reporting cells/configuration, and/or other parameters associated with its measurement configuration, where such limitation is applied when the SCG is dormant. For example, a WTRU may be configured to measure only the PSCell when the SCG is dormant. A WTRU may stop measurements on all other cells associated with the SCG, or on frequency associated with the PSCell when the SCG is dormant, and not report such measurements to the network. In another example, a WTRU may be configured to trigger only a single event (e.g., event A2 only) or a subset of the configured events when the SCG is dormant. In another example, a WTRU may perform limited/ho/different L3 filtering of cells associated with the SCG when the SCG is dormant.

In another example, a WTRU may ignore the PSCell, SCells on the SCG, or any other cell on frequencies associated with these cells as triggering any events associated with measurements (e.g., the PSCell cannot trigger an event where the PSCell is one of the cells in the event definition of the triggering event). In another example, a WTRU may suspend all cell level/beam level measurements on the SCG, and perform only beam level/cell level measurements when the SCG is suspended. In yet another example, a WTRU may monitor only a single RS type when performing measurements on a suspended SCG.

A WTRU may also perform measurements, possibly of frequencies/cells associated with the SCG, according to a reduced/relaxed measurement cycle and/or reporting period when the WTRU operates on a dormant SCG.

In other embodiments, a WTRU may be configured to dynamically change a characteristic of the measurement process based on some factors or events that occur while the WTRU has a dormant SCG configured. For example, a WTRU may be configured with multiple measurement configurations, where each measurement configuration may be applied depending on a specific condition associated with the WTRU. For example, a WTRU may be configured with multiple measurement parameters (e.g., measurement cycle and/or a reporting period) and apply a different parameter depending on the specific condition at the WTRU. The measurement parameter or configuration that may be changed may further include any of the examples associated with a limited RRM measurement configuration described above (e.g., measuring only the PSCell, triggering only a limited number of events, etc.).

While this embodiment is described based on RRM measurements, it is also applicable to other measurements such as RLM for RLF determination or CQI reporting.

A WTRU may determine the measurement parameter or measurement configuration based on a variety of conditions at the WTRU. For example, the WTRU may determine the measurement parameter or measurement configuration based on conditions related to the configuration of the bearers (i.e. whether the WTRU is configured with a SCG bearer, split bearer, etc). Specific conditions may consist of whether or not a particular bearer (e.g., split bearer, SCG bearer) is configured, whether such bearer is configured with a specific priority, and/or whether such bearer is terminated at the MCG or the SCG. For example, a WTRU may allow dynamic change of the measurements as long as the WTRU is configured with at least one split bearer, otherwise, the WTRU will use a single measurement configuration for measurements related to the SCG while the SCG is dormant;

The WTRU may also determine the measurement parameter or measurement configuration based on conditions related to UL buffer status at the WTRU, possibly on one or a subset of bearers. For example, conditions may consist of the amount of data in the buffers at the WTRU (possibly relative to a threshold), of a measure of the change in the UL buffer status at the WTRU (possibly relative to a threshold), whether there is UL data pending for transmission at a WTRU, possibly associated with one or a subset of bearers. For example, a WTRU may increase its measurement period based on the UL buffer status on a split bearer. Also for example, a WTRU may enable measurements and/or reporting of SCG-related measurements when the UL buffer status is above a threshold.

The WTRU may also determine the measurement parameter or measurement configuration based on conditions related to DL data rate at the WTRU, possibly on one of a subset of bearers. Specifically, conditions may consist of the DL data rate being above/below a threshold, possibly for one or a subset of bearers. For example, a WTRU may enable measurements and/or reporting of SCG-related measurements when the DL data rate on all split bearers is above a threshold.

The WTRU may also determine the measurement parameter or measurement configuration based on conditions related to the measurement level of the PSCell. Specifically, conditions may consist of the value of the PSCell measurements.

The WTRU may also determine the measurement parameter or measurement configuration based on conditions related to timing alignment and/or value of the TAT. Specifically, conditions may consist of whether the TAT is running, whether it has expired, whether it was restarted, what value it may have, or the % value it may have. For example, a WTRU may perform measurements/reporting, possibly associated with the SCG, as long as the TAT is running, or as long as any of the aforementioned conditions are satisfied.

The WTRU may also determine the measurement parameter or measurement configuration based on conditions related to DRX configuration and/or status on MCG. Specifically, conditions may consist of whether the WTRU is configured with DRX, whether a DRX related timer is running, or the relative/% value of a DRX related timer. For example, a WTRU may perform measurements/reporting, possibly associated with the SCG, as long as the WTRU is not configured with DRX. For example, a WTRU may perform measurements/reporting, possibly associated with the SCG, using a first configuration when the inactivity timer is running, and using a second configuration when the inactivity timer is not running.

The WTRU may also determine the measurement parameter or measurement configuration based on conditions related to the mobility of the WTRU. Specifically, conditions may include how frequently the WTRU performs mobility (e.g., HO, cell change), the amount by which the measurements of cells on the SCG frequency change, possibly with respect to multiple cells on the SCG frequency.

In another embodiment, a WTRU may disable conditional PSCell change when SCG is deactivated. A WTRU may suspend any conditional PSCell change when the SCG is deactivated. Specifically, a WTRU may stop monitoring the condition associated with conditional PSCell change when the SCG is deactivated. The WTRU may resume monitoring of conditional PSCell change when the SCG is activated (following deactivation).

In another embodiment, a WTRU is configured with a condition related to when to perform RLM/RLF on a suspended SCG. Such a limited RLM/RLF may be performed when a condition is satisfied at the WTRU. In the case where such condition is not satisfied, a WTRU may suspend RLM/RLF performance on the suspended SCG. Such condition may be one or a combination of the following: a condition associated with RRM measurements, a condition associated with data transmission/reception on the MCG, and/or on a condition associated with a configuration of bearers and/or their priority.

When the condition is associated with RRM measurements, for example, the RRM measurements on the SCG (e.g., of the PSCell) are below a threshold.

When the condition is associated with data transmission/reception (potentially intensity thereof) on the MCG, for example, the amount of data in the buffers at the WTRU, possibly on a specific/configured bearer, is above a threshold. Additionally, for example, the WTRU has received a PDU on a specific bearer (e.g., MCG split bearer) within a recent period of time.

When the condition is associated with configuration of bearers and/or their priority, for example, the WTRU is configured with at least one split bearer or SCG bearer at the time when the SCG of the WTRU is suspended, possibly where such at least one bearer has a priority which is higher than a threshold.

Any of the embodiments and conditions described elsewhere herein (e.g., for adapting CQI reporting) may also be used to determine whether to perform RLM/RLF on a suspended SCG.

In an embodiment, a WTRU may monitor a subset of beams associated with a dormant SCG. In one embodiment, a WTRU with a dormant SCG may monitor a subset of beams associated with the dormant SCG (e.g., PSCell on the SCG). In another embodiment, a WTRU may be configured (by the network) with the specific beam(s) to monitor when the SCG is dormant. For example, the WTRU may receive one or more beam IDs from the network, in the deactivation message from the MCG (to move the SCG from active to dormant). For example, the WTRU may (in addition to the previous solution) receive an updated set of beams or beam IDs to monitor in a DL transmission from the MCG or SCG. For example, the transmission may be a DL RRC message from the MCG. In another example, the transmission may be a response to an UL RACH, UL SRS, etc. procedure initiated by the WTRU on the SCG.

In yet another embodiment, a WTRU may determine the set of beams and/or the number of beams to monitor based on any of the following: (1) NW configuration; (2) DL measurements of the beam (e.g., RSRP, RSRQ, etc.); (3) the configured SCG/split bearers; (4) other DL measurements (e.g., CQI, RRM, RLM, etc.); (5) the number of high priority transmissions (e.g., on MCG) received over a period of time (possibly associated with one or more split bearers); (6) the arrival/amount of data, possibly associated with a SCG/split bearer; (7) the configuration of the bearers; and/or (8) the DRX/activity on the MCG.

In an embodiment where the WTRU determines the set of beams and/or number of beams based on the NW configuration, the WTRU may be configured with a number of beams to monitor (e.g., N number of beams) and may monitor N beams based on the rules described above. The thresholds, conditions, events, etc., associated with any other option may be further configured by the network.

In an embodiment where the WTRU determines the set of beams and/or number of beams based on DL measurements of the beam, the WTRU may monitor the best N beams when the SCG is deactivated, where N may be NW configured or depend on any of the other factors associated with this solution. For example, the WTRU may monitor the beams whose quality (in terms of DL measurements) are above a NW configured threshold.

In an embodiment where the WTRU determines the set of beams and/or number of beams based the configured SCG/split bearers, the WTRU may determine the number of beams to monitor based on the configured SCG/split bearers. For example, the WTRU may be configured with a minimum number of beams to monitor for each configured SCG/split bearer, and may monitor a number of beams which satisfied such configuration for each configured SCG/split bearer.

The WTRU may monitor at least one beam associated with the SCG as long as it has at least one SCG/split bearer configured. The WTRU may also monitor at least one beam associated with the SCG as log as it has at least one SCG/split bearer configured with a specific property, where such property may be: (1) a priority above a configured threshold or (2) an explicit configuration for the SCG/split bearer indicating the WTRU should monitor at least one beam.

In an embodiment where the WTRU determines the set of beams and/or number of beams based on other DL measurements, the WTRU may determine the number of beams to monitor based on the measured CQI on the SCG. Specifically, the WTRU may be configured with a number of beams to monitor for each measured CQI or range of CQI, possibly associated with the SCG. For example, the WTRU may measure 0 beams if the RRM measurements (e.g., RSRP) of the PSCell is below a threshold, and may measure N beams if the RRM measurements (e.g., RSRSP) of the PSCell is above a threshold. In another example, the number of beams a WTRU measures may depend on the difference in RRM measurements between the PSCell in dormancy and a neighbor cell in the configured RRM measurements.

In an embodiment where the WTRU determines the set of beams and/or number of beams based on the number of high priority transmissions received over a period of time, the WTRU may be configured with a time window (e.g., in slots). At a given time N, the number of beams measured may be determined based on the number of high priority transmissions received over the past number of slots associated with such window. The WTRU may be configured with a table of number of high priority transmissions over the time window, and the associated number of beams to measure For example, the WTRU may start to monitor at least one beam, or N beams upon reception of one high priority transmission. The WTRU may stop monitoring the at least one beam, N beams, or start monitoring fewer beams following a period of time elapsed without receiving further high priority transmissions.

In an embodiment where the WTRU determines the set of beams and/or number of beams based on the arrival/amount of data, the WTRU may start monitoring one or more beams upon the arrival of data at the buffers associated with a SCG or split bearer. For example, the WTRU may change from monitoring a first number of (possibly configured) beams to monitoring a second number of (possibly configured) beams upon the arrival of data at the buffers associated with a SCG or split bearer.

The WTRU may also monitor the number of beams depending on the data volume (UL or DL) associated one or more split bearer. The WTRU may be configured with a number of beams to monitor, or a threshold for beam monitoring for a given data volume on a split bearer. For example, the WTRU may monitor 0 beams when the data volume is below a threshold, and may monitor N beams when the data volume is above a threshold. In another example, the WTRU may monitor all beams whose RSRP is above a first beam threshold when the data volume is below a data threshold, and may monitor all beams whose RSRP is above a second beam threshold when the data volume is above a data threshold.

In one embodiment where the WTRU determines the set of beams and/or number of beams based on the configuration of the bearers, the WTRU may monitor a first number of beams (e.g., 0) if the WTRU is configured with no split/SCG bearers when the SCG is dormant. Otherwise, the WTRU may monitor a configured number of beams or at least one beam if the WTRU is configured with at least one SCG bearer and/or split bearer (whereby transmissions on the split/SCG bearer are suspended while the SCG is deactivated/dormant).

In another embodiment where the WTRU determines the set of beams and/or number of beams based on the DRX/activity on the MCG, the WTRU may monitor a first number of beams (e.g., 0) on slots in which the WTRU is in DRX on the MCG, and may monitor a second number of beams (e.g., a configured number, or at least one beam) on slots when the WTRU is active on the MCG.

In another embodiment, a WTRU configured for MR-DC with a MCG and a SCG, and configured to operate on a dormant BWP of the PSCell is disclosed. The WTRU may receive, from the NW, a configuration of SCG bearers and/or split bearers and determine whether to transmit PSCell CQI to the SCG or the MCG based on the received SCG/Split bearer configuration, and on condition that the WTRU determines to transmit PSCell CQI to the MCG, the WTRU may transmit the CQI information to the MCG in a MAC CE, and on condition that the WTRU determines to transmit PSCell CQI to the SCG, the WTRU may transmit the CQI to the SCG using PUCCH resources configured by the network for the dormant BWP.

In another embodiment, a WTRU configured for MR-DC with a MCG and a SCG, and, for example, configured to operate on a dormant BWP of the PSCell is disclosed. When the WTRU is configured to (or determines to) report CQI of the PSCell to the SCG, the WTRU may select between a first periodicity/pattern of CQI reporting and a second periodicity/pattern of CQI reporting based on the number of received high priority DCIs on the MCG in a given time period and DRX status on the MCG. The WTRU may transmit the CQI of the PSCell to the SCG (e.g., using PUCCH resources configured by the network for the dormant BWP) according to selected periodicity/pattern In another embodiment, a WTRU configured for MR-DC with a MCG and SCG is disclosed. The WTRU may determine whether to transmit CQI reports using PUCCH or MAC CE based on the timing alignment timer associated with the PSCell. If TAT is running, the WTRU may report CQI on PUCCH, otherwise, the WTRU may transmit the CQI reports in a MAC CE using 2-step RACH.

In another embodiment, a WTRU configured for MR-DC with a MCG and SCG, and configured to operate on a dormant BWP of the PSCell is disclosed. The WTRU, upon reception of a message from the MCG, may switch to the active BWP on the PSCell of the SCG. Such message may be, for example, a RRC message or a MAC CE.

Figure 6:
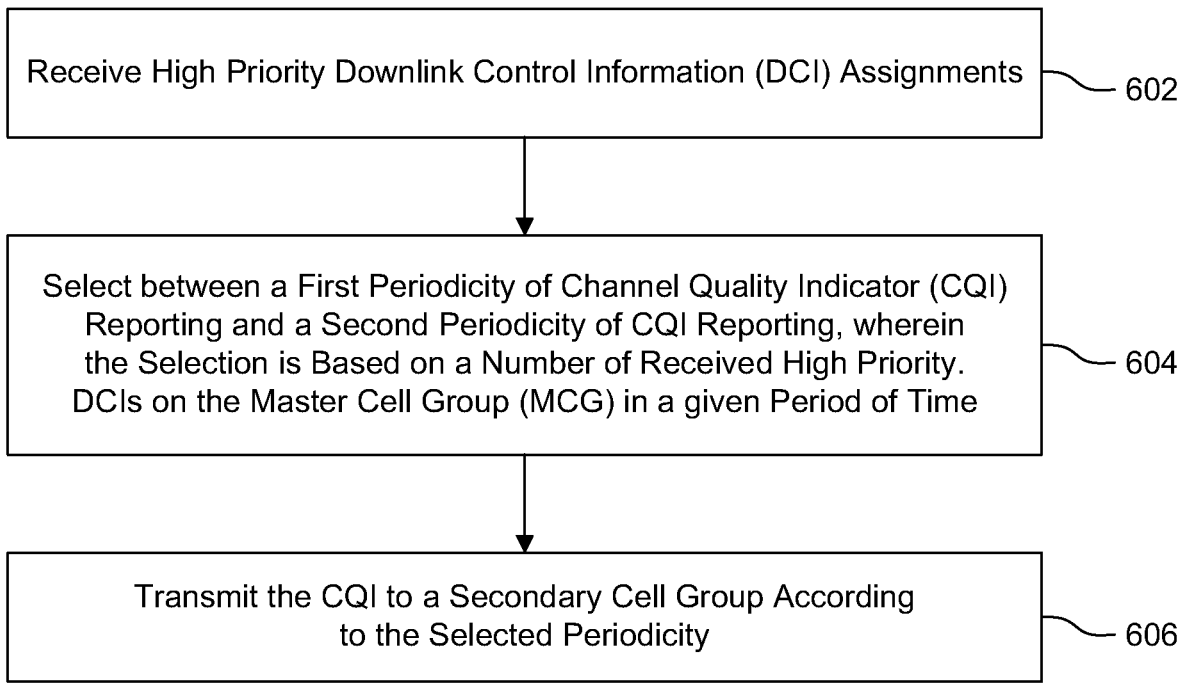
FIG. 6 illustrates an exemplary process a WTRU may perform for power savings on a dormant SCG.

FIG. 6 shows an exemplary process a WTRU may perform for power savings on a dormant SCG. At 602, the WRTU may receive high priority downlink control information (DCI) assignments. At 604, the WTRU may select between a first periodicity of channel quality indicator (CQI) reporting and a second periodicity of CQI reporting, wherein the selection is based on a number of received high priority DCIs on the master cell group (MCG) in a given period of time. At 606, the WTRU may transmit the CQI to a secondary cell group according to the selected periodicity.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. A wireless transmit/receive unit (WTRU) comprising a processor, the processor configured to:

receive a number of high priority downlink control information (DCI) during a period of time via one or more cells of a master cell group (MCG);

determine to transmit a channel quality indicator (CQI) report to a cell of a secondary cell group (SCG) in accordance with a first reporting periodicity, wherein the first reporting periodicity is based on the number of high priority DCIs received via the one or more cells of the MCG during the period of time; and transmit the CQI to the cell of the SCG according to the first reporting periodicity.

2. The WTRU of claim 1, wherein the number of high priority DCIs comprises a first number of high priority DCIs, and wherein the processor is configured to transmit CQI reports to the cell of the SCG in accordance with a second reporting periodicity, wherein the second reporting periodicity is based on a second number of high priority DCIs received via the one or more cells of the MCG during a second period of time, wherein the second number is greater than the first number, and the first reporting periodicity is longer than the second reporting periodicity.

3. The WTRU of claim 1, wherein the processor is configured to determine to not transmit CQI to the cell of the SCG based on not receiving any high priority DCIs for a given period of time.

4. The WTRU of claim 1, wherein the period of time is a preconfigured period of time.

5. The WTRU of claim 1, wherein the CQI report is based on a change in measured CQI.

6. The WTRU of claim 1, wherein the processor is configured to receive a split bearer configuration corresponding to at least one split bearer associated with both the MCG and the SCG.

7. The WTRU of claim 6, wherein the processor is configured to determine whether to report CQI associated with a primary cell of the SCG (PSCell) to the MCG or the SCG based on the split bearer configuration.

8. A method performed by a wireless transmit receive unit (WTRU), the method comprising:

receiving a number of high priority downlink control information (DCI) during a period of time via one or more cells of a master cell group (MCG);

determining to transmit a channel quality indicator (CQI) report to a cell of a secondary cell group (SCG) in accordance with a first reporting periodicity, wherein the first reporting periodicity is based on the number of high priority DCIs received via the one or more cells of the MCG during the period of time; and transmitting the CQI to the cell of the SCG according to the first reporting periodicity.

9. The method of claim 8, wherein the number of high priority DCIs comprises a first number of high priority DCIs, and wherein the method comprises transmitting CQI reports to the cell of the SCG in accordance with a second reporting periodicity, wherein the second reporting periodicity is based on a second number of high priority DCIs received via the one or more cells of the MCG during a second period of time, wherein the second number is greater than the first number, and the first reporting periodicity is longer than the second reporting periodicity.

10. The method of claim 8, further comprising determining not to transmit CQI to the cell of the SCG based on not receiving any high priority DCIs for a given period of time.

11. The method of claim 8, wherein the period of time is a preconfigured period of time.

12. The method of claim 8, wherein the CQI report is based on a change in measured CQI.

13. The method of claim 8, further comprising receiving a split bearer configuration corresponding to at least one split bearer associated with both the MCG and the SCG.

14. The method of claim 13, further comprising determining whether to report CQI associated with a primary cell of the SCG (PSCell) to the MCG or the SCG based on the split bearer configuration.

15. The WTRU of claim 1, wherein the processor is configured to determine, based on the number of high priority DCIs received via the one or more cells of the MCG during the period of time, the first reporting periodicity.

16. The method of claim 8, comprising determining, based on the number of high priority DCIs received via the one or more cells of the MCG during the period of time, the first reporting periodicity.

* * * * *